N. S. Warner,

Toy Velocipede.

No. 4,120. Reissued Sept. 13. 1870.

Witnesses:-
A. H. Rowe.
Joe Stayton.

N. S. Warner
by his Atty
Wm. D. Baldwin

H. PETERS, PHOTO-LITHOGRAPHER, WASHINGTON, D. C.

United States Patent Office.

NATHAN S. WARNER, OF BRIDGEPORT, CONNECTICUT.

*Letters Patent No.* 94,676, *dated September* 7, 1869; *reissue No.* 4,120, *dated September* 13, 1870.

IMPROVEMENT IN A TOY VELOCIPEDE.

The Schedule referred to in these Letters Patent and making part of the same.

I, NATHAN S. WARNER, of Bridgeport, in the county of Fairfield and State of Connecticut, have invented certain new and useful Improvements in Toy Velocipedes, of which the following is a specification.

My invention relates to that class of toy velocipedes which is automatically propelled by a spring, or other motive-power, and provided with a joint in the frame connecting the front and hind wheels, by which the direction of movement of the velocipede may be changed, in order to allow it to move in curved as well as in straight lines.

Such toy velocipedes, previous to the date of my invention, were constructed to turn on a vertical pivot only, and, consequently, could only turn in a horizontal plane.

The object of the first part of my invention is to enable the front wheel not only to be turned horizontally, but also to be inclined to one side or the other from a vertical line; to which end my improvement consists—

First, in so arranging a joint in the connecting-frame between the wheels of a velocipede, that the front wheel may be inclined sidewise from a vertical line, as well as turned at an angle to the hind wheels.

The object of the next part of my invention is, to enable the imitation-person or rider to incline his body to the side to which the velocipede turns, and thus closely to imitate the natural rider; to which end my improvement consists—

Second, in combining the hind wheels and the front wheel by means of a joint, which will permit the front wheel to be inclined to one side as well as turned horizontally, and in mounting the imitation-rider on the frame connecting said wheels in such manner that his movements shall conform to those of the front wheel.

The object of the next part of my invention is to prevent any tendency of the toy to upset; to which end my improvement consists—

Third, in combining the hind wheels with the front wheels, by means of a joint, which permits the front wheel both to turn horizontally, and to be inclined to one side from a vertical line, and in mounting the propelling mechanism upon said front wheel, thus lowering the center of gravity of the front wheel, and overcoming its tendency to upset.

In the accompanying drawing—

I, by preference, make my toy velocipede with three wheels, as that is the smallest number with which a proper balance can be maintained.

The rear axle *a* is mounted upon two wheels, A.

A forked longitudinal bar or bifurcated frame, B, is connected near one end with the axle *a*, and at the other with a joint, C, attached to the frame E, in which the front wheel F is mounted.

Figure 4:
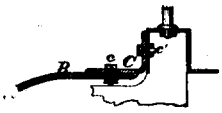
Figure 4 represents a vertical longitudinal section through the joint.
Figure 2:
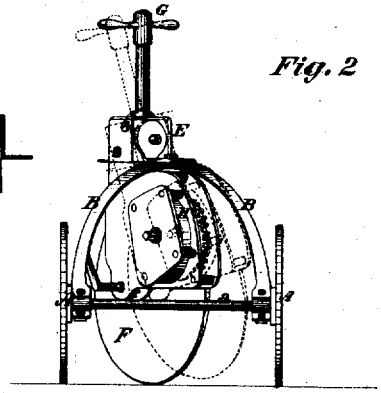
Figure 2 represents a rear elevation of the same, the dotted lines showing the front wheel both turned at an angle horizontally, and inclined to the perpendicular.

The joint is plainly shown in fig. 4, and has, in this instance, both a vertical pivot, *c*, and a horizontal one, *c'*, by which means the front wheel can either be turned until its face is inclined to that of the hind wheels, but perpendicular to the horizon, as shown in full lines in fig. 2, or inclined to the horizon, as shown in dotted lines in fig. 2.

An imitation-rider, D, is mounted on the frame E, in front of the joint C.

The limbs of the rider are suitably jointed. His feet rest on the cranks *f* of the front wheel, while his arms are secured to the steering-handles G.

The velocipede is propelled by means of a coiled spring, H, mounted on the frame E, and connected with the front axle by proper gearing, *h*, as indicated in the drawing. The spring must, of course, be provided with proper mechanism for winding it up, but such mechanism is familiar, and need not here be decribed.

To operate the toy, the spring is wound up in the usual way.

Figure 1:
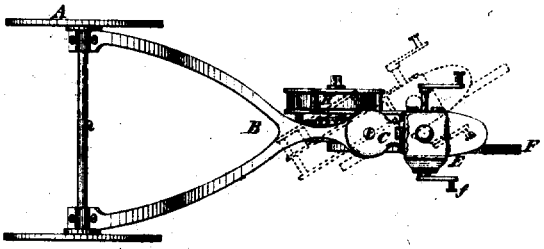
Figure 1 represents a plan or top view of my improved velocipede without the rider, the dotted lines showing the front wheel turned at an angle horizontally, but not inclined to the perpendicular.

If the velocipede is to run straight forward, the front wheel is set parallel with the others, as in the full lines in fig. 1, and placed upon the floor, when it will run until the spring runs down, or an obstacle is encountered.

If set as shown in dotted lines in fig. 1, the toy will describe a series of circular curves.

Figure 3:
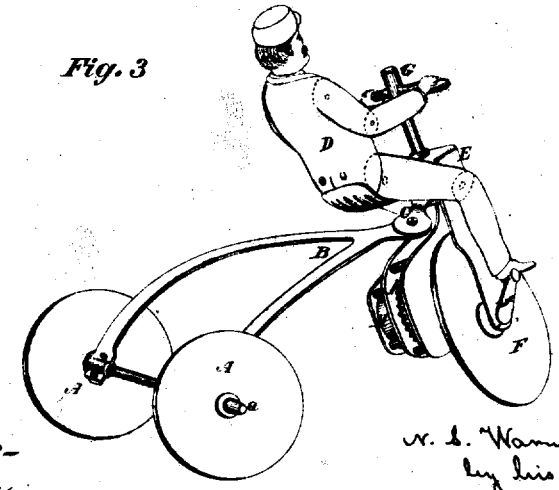
Figure 3 represents a view, in perspective, with the rider mounted, and the front wheel in the position indicated by the dotted lines in fig. 2.

If set as in fig. 3, the curves described will be shorter than if the front wheel were not inclined from the perpendicular.

I am thus enabled to produce a pleasing toy which can move in various directions.

As the propelling mechanism and imitation-rider are both mounted upon and conform to the movements of the front wheel, their weight tends to keep it steady.

I am aware that the front wheel of a velocipede, heretofore, has been mounted on a steering-handle, in such manner that the wheel could be inclined as well as turned on the pivot of the steering-handle. I do not, therefore, broadly claim every mode of inclining the front wheel of a velocipede.

I claim as my invention—

1. The combination, in a toy velocipede, of automatic propelling mechanism, the hind wheels, the front wheel, and the joint in the frame connecting the front and hind wheels, said joint being constructed, as set forth, to permit the front wheel to be set at an inclination sidewise from the perpendicular, as described.

2. The combination of the hind wheels, the front wheel, the joint C between them, by which the front wheel can not only be turned horizontally at an angle to the hind ones, but also inclined sidewise from a vertical line, and the imitation-rider mounted on the front wheel, all these parts being constructed to operate in combination, substantially as herein set forth.

3. The combination of the hind wheels, the front wheel, the joint connecting them, the imitation-rider, and the driving mechanism mounted on the front wheel, substantially as hereinbefore set forth.

N. S. WARNER.

Witnesses:
H. R. LACEY,
F. HURD.